No. 683,461.  
G. R. HARDISON.  
CUTTING APPARATUS FOR MOWING MACHINES.  
(Application filed Mar. 20, 1901.)  
Patented Oct. 1, 1901.
(No Model.)
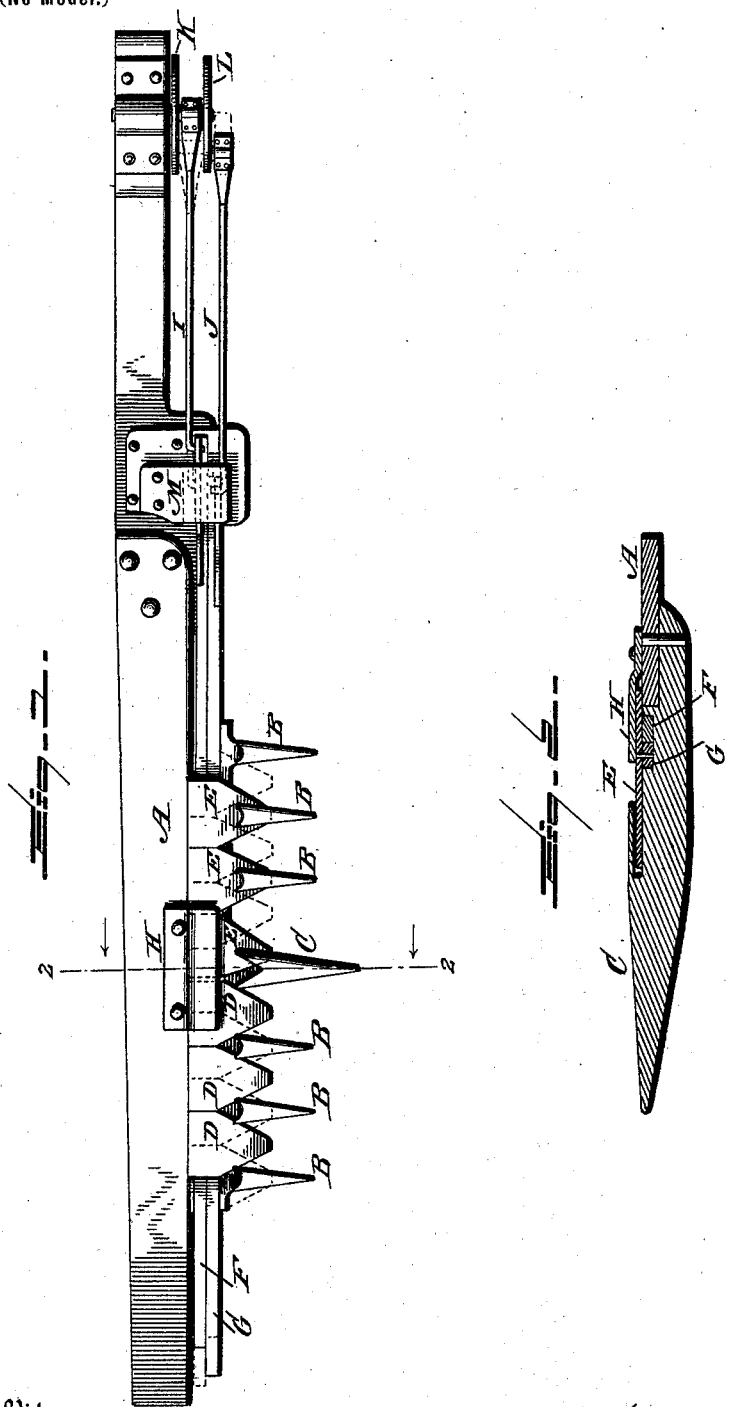

UNITED STATES PATENT OFFICE.

GEORGE R. HARDISON, OF GOULDSBORO, MAINE.

CUTTING APPARATUS FOR MOWING-MACHINES.

SPECIFICATION forming part of Letters Patent No. 683,461, dated October 1, 1901.

Application filed March 20, 1901. Serial No. 52,011. (No model.)

*To all whom it may concern:*

Be it known that I, GEORGE R. HARDISON, a citizen of the United States, residing at Gouldsboro, in the county of Hancock and State of Maine, have invented certain new and useful Improvements in Cutting Apparatus for Mowing-Machines; and I do hereby declare that the following is a full, clear, and exact description of the same, reference being had to the annexed drawings, making a part of this specification, and to the letters of reference marked thereon.

The present invention has reference to that class of cutting apparatus for mowing-machines in which the cutter-bars and cutters thereon have imparted to them a reciprocating motion through the medium of connecting-rods and cranks or other similar means for operating the rods.

The object of the invention is to improve the cutting apparatus, whereby the cutting action is materially facilitated and the usual jar or "shake" to the movable parts is avoided, as will be hereinafter described and claimed.

Figure 1 of the drawings is a top plan view of a cutting apparatus embodying my invention and showing the cutters in two positions in full and dotted lines; Fig. 2, a transverse section, on an enlarged scale, taken on line 2 2 of Fig. 1.

In the accompanying drawings, A represents the usual finger-bar, and B the guard-fingers suitably connected thereto, a central guard-finger C being used of increased size both in length and width to increase the cutting effect of the apparatus.

I do not wish to limit my invention to any special construction of finger-bar or guard-fingers or of the cutters, as any changes in form and construction may be resorted to without in any manner affecting the essential feature of the invention.

The cutters are arranged in two sections, as indicated at D E, and although I have shown three cutters in each section there may be any number of cutters comprising each section, as found most desirable, this being left to the judgment of the manufacturer, depending entirely upon the size of the mowing-machine. The cutter-sections are each connected to their respective cutter-bars, the cutters D being secured to the bar F, and the cutters E are secured to the bar G, a guide-plate H being connected to the finger-bar A and extending over a sufficient distance to be above the heel of the cutters.

The cutter-bars F G are connected, respectively, with pitman-rods I J, the rod I being eccentrically connected to the two disks K L and the rod J in like manner to the disk L. The employment of the two disks K L, connecting them together and eccentrically connecting the two pitman-rods to the disks, forms a perfect driving mechanism necessary to impart to the two sections of cutters D E an alternate reciprocating motion, the guide-plate H holding the cutters in working position.

It should be understood that the two sets of cutters are not arranged one above the other, but on the same horizontal and vertical plane, and the cutter-bars are arranged on the same horizontal plane, but on different vertical planes, the same set of finger-bars answering for both sets of cutters.

The two sections of the cutters are so connected with their driving mechanism with relation to each other that when in motion one section will cut while the other section is running light, causing the machine to do its work with one-half the power that is necessary in the ordinary cutting apparatus and obviating to a great extent the usual shake incident to the rapid motion of the cutters, each section of cutters working independent of the other and without any great degree of vibration.

Having now fully described my invention, what I claim as new, and desire to secure by Letters Patent, is—

1. A cutting apparatus for mowing-machines, comprising a single set of guard-fingers and two independent sets of cutters upon the same horizontal and vertical planes, and cutter-bars on the same horizontal but different vertical planes, and means for imparting to the cutters an alternately-reciprocating motion, consisting of two rotatable disks and pitman-rods connecting with the cutter-bars and eccentrically connected to the disks, one of said pitman-rods being located between the two disks and the other upon the outside of the outer disks, substantially as and for the purpose set forth.

2. The combination of a finger-bar and a single set of guard-fingers with the central guard-finger of increased size both as to length and width, cutters arranged in two independent sections upon the same horizontal and vertical planes, a cutter-bar connected to each cutter-section and arranged in the same horizontal but different vertical planes, a guide-plate on the finger-bar opposite the enlarged guard-finger and overlapping the heels of the cutters, pitman-rods connected to said cutter-bars, a guide-plate for the inner ends of the cutter-bars, connected disks and connections between the same and the said rods, the inner rod being eccentrically connected to the two disks and the other rod eccentrically connected to the outer disk, all substantially as shown and described.

In testimony that I claim the above I have hereunto subscribed my name in the presence of two witnesses.

GEORGE R. HARDISON.

Witnesses:
ELVIRA HARDISON,
RILLA SARGENT.